United States Patent [19]

Sukegawa

[11] Patent Number: 5,557,767
[45] Date of Patent: Sep. 17, 1996

[54] DISK CONTROL SYSTEM USING IDENTIFICATION CODES FOR RETRIEVING RELATED DATA FOR STORAGE IN A READ AHEAD CACHE

[75] Inventor: Hiroshi Sukegawa, Tokyo, Japan

[73] Assignee: Kabushiki Kaisha Toshiba, Kawasaki, Japan

[21] Appl. No.: 219,896

[22] Filed: Mar. 30, 1994

[30] Foreign Application Priority Data

Mar. 31, 1993 [JP] Japan ..................................... 5-074440

[51] Int. Cl.⁶ ................................................... G06F 13/00
[52] U.S. Cl. .................... 395/440; 395/464; 364/DIG. 1; 364/243.41; 364/239.4; 364/248.1
[58] Field of Search ..................................... 395/464, 440, 395/439; 364/948

[56] References Cited

U.S. PATENT DOCUMENTS 5,410,653  4/1995  Macon, Jr. et al. ..................... 395/250

FOREIGN PATENT DOCUMENTS 3-9446  1/1991  Japan .

*Primary Examiner*—Eddie P. Chan
*Assistant Examiner*—Kevin L. Ellis
*Attorney, Agent, or Firm*—Finnegan, Henderson, Farabow, Garrett & Dunner, L.L.P.

[57] ABSTRACT

In accordance with a write request from a host system in a direction of incrementing an address, a controller generates the same writing code and writes the writing code with ID information of each sector in a hard disk drive unit. Even when a series of related data are written on a plurality of sectors having non-sequential addresses, the same writing code is written in the ID information of each sector as far as the values of the sector addresses to be written change in the direction of incrementing the address. When the sector data is read ahead and registered in a read ahead cache in accordance with a data read request from the host system, a series of related sector data are registered in the read ahead cache on the basis of the writing code.

18 Claims, 9 Drawing Sheets

FIG. 1A (PRIOR ART)

| SECTOR No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DATA | A0 | A1 | B0 | B1 | B2 | B3 | C0 | C1 | C2 | C3 | D0 | E0 | E1 | E2 |

FIG. 1B (PRIOR ART)

| SECTOR No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DATA | Z0 | Z1 | B0 | B1 | B2 | B3 | C0 | C1 | C2 | C3 | Z2 | Z3 | E1 | E2 |

FIG. 3A

| SECTOR No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DATA | A0 | A1 | B0 | B1 | B2 | B3 | C0 | C1 | C2 | C3 | D0 | E0 | E1 | E2 |
| WRITING CODE | 01 | 01 | 01 | 01 | 01 | 01 | 01 | 01 | 01 | 01 | 01 | 01 | 01 | 01 |

FIG. 3B

| SECTOR No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DATA | Z0 | Z1 | B0 | B1 | B2 | B3 | C0 | C1 | C2 | C3 | Z2 | Z3 | E1 | E2 |
| WRITING CODE | 02 | 02 | 01 | 01 | 01 | 01 | 01 | 01 | 01 | 01 | 02 | 02 | 01 | 01 |

PROCESS FOR HOST (READING PROCESS)

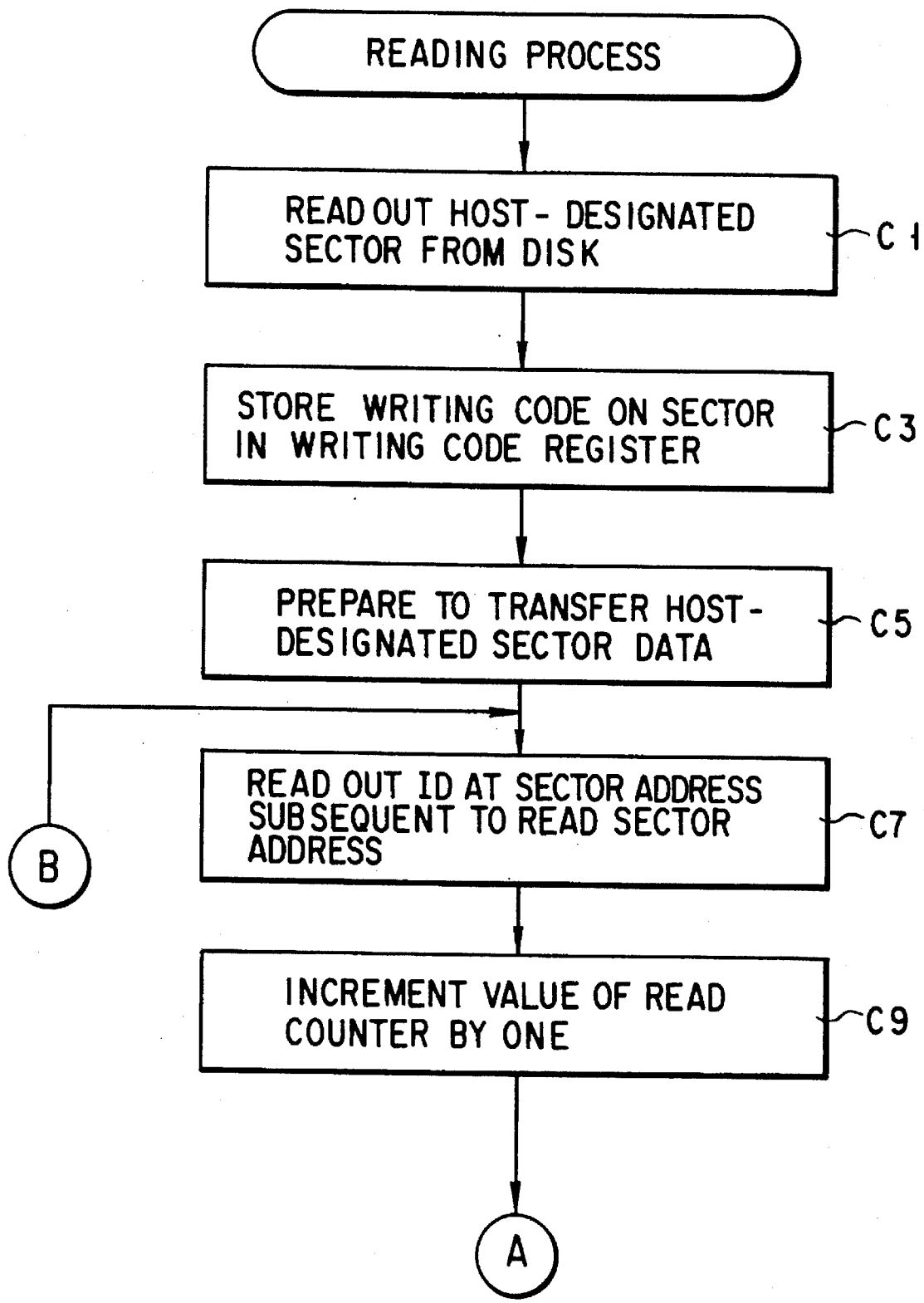
F I G. 7A

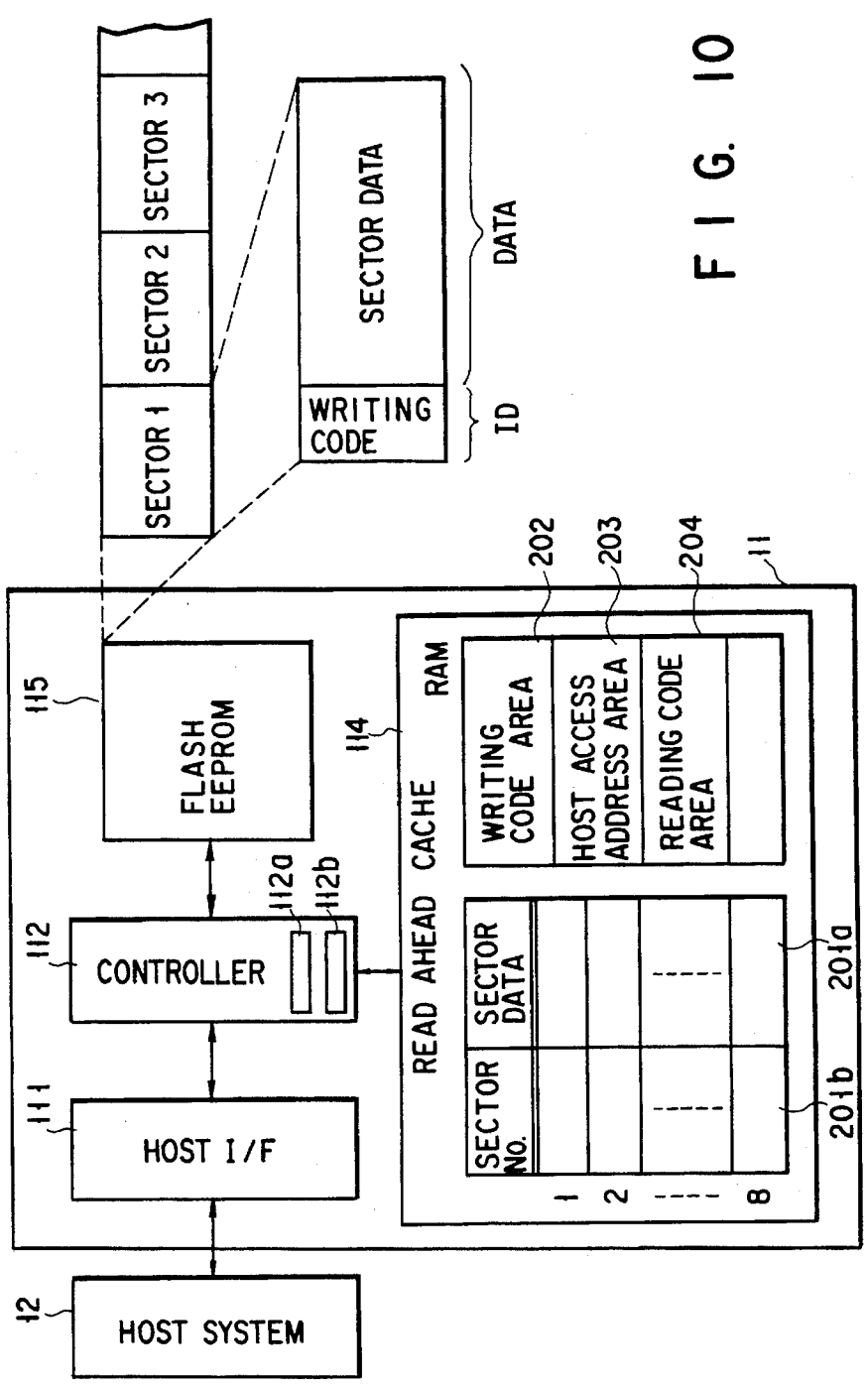

DISK CONTROL SYSTEM USING IDENTIFICATION CODES FOR RETRIEVING RELATED DATA FOR STORAGE IN A READ AHEAD CACHE

BACKGROUND OF THE INVENTION

1. Field of the Invention

The present invention relates to a disk control system and, more particularly, to a disk control system having a read ahead cache for holding data read ahead from a disk unit.

2. Description of the Related Art

In many conventional information processing apparatuses such as a workstation or personal computer, a magnetic disk unit (hard disk drive) is used as a secondary memory. Despite its high reliability in recording and low bit unit cost, the access speed of the magnetic disk unit is low.

More specifically, the operation principle of the magnetic disk unit is that a magnetic head is moved on a disk surface to write/read data on/from the rotating disk. The operation control of such a mechanical movable portion undesirably makes the access speed of the unit low.

Recently, a magnetic disk unit having a read ahead cache (read ahead buffer) has been developed to realize rapid data reading. In the unit using the read ahead cache, when data read-requested by a host unit is present in the read ahead cache (cache hit), the data can be immediately sent from the read ahead cache to the host unit without access to the magnetic disk unit. In this case, the read data is determined in a shorter period of time after the host unit issues the read command. A high-performance host unit can thus be obtained. This method is known as read ahead cache method.

The capacity of a general read ahead cache depends on a corresponding disk unit or controller for controlling this disk unit. When the data read-requested by the host unit is not present in the read ahead cache (cache miss hit), the data read out from the disk and data subsequent to this data are newly stored in the read ahead cache, updating the contents of the read ahead cache.

In the conventional method, however, data on the sector subsequent to the sector read-requested by the host unit is unconditionally read ahead in the read ahead cache. For this reason, the hit rate of the read ahead cache is low, and the frequency of read access to the magnetic disk unit or rewrite of the read ahead cache is relatively high.

More specifically, when read access from the host unit is continuously performed in an order of addresses, the hit rate of the read ahead cache is high. However, when a series of related data are written on a plurality of sectors having non-sequential addresses, the read access from the host unit becomes random access at non-sequential addresses, thereby greatly decreasing the hit rate.

A conventional data writing operation in a read ahead cache will be described below with reference to FIGS. 1A and 1B.

When a magnetic disk unit is used for the first time (anew formatted), all sectors on this magnetic disk unit are unused. Normally, data are sequentially written in an order of sector addresses in accordance with an instruction from a host unit. In FIG. 1A, sector data A0 and A1 of a file A are stored at sector addresses (sector number) 1 and 2. Similarly, sector data B0 to B3 of a file B are stored at sector addresses 3 to 6, sector data C0 to C3 of a file C are stored at sector addresses 7 to 10, sector data D0 of a file D is stored at sector address 11, and sector data E0 to E2 of a file E are stored at addresses 12 to 14.

In this state, when the data are rewritten in accordance with the data processing of the host unit, the host unit overwrites new data on the sectors storing unnecessary data. For example, in a state shown in FIG. 1A, when the files A, D, and E are unnecessary and a file Z (sector data Z0 to Z3) is written, the sector data Z0 to Z3 are written on the sectors storing the unnecessary data in the order of addresses, as shown in FIG. 1B. Therefore, the sector data Z0 and Z1 are written at sector addresses 1 and 2, and the sector data Z2 and Z3 are written at sector addresses 11 and 12.

In a state shown in FIG. 1B, when the host unit reads out the sector data Z0 and Z1 at sector addresses 1 and 2 from the magnetic disk unit, and the read ahead cache can store eight sectors, the data (B0, B1, B2, B3, C0, C1, C2, and C3) on the eight sectors subsequent to sector address 2 are stored in the read ahead cache.

Normally, the host unit continuously reads out the related data. Therefore, it is likely that the data Z2 and Z3 which belong to the same file as in the sector data Z0 and z1 are subsequently read out. In this case, a miss hit of the read ahead cache occurs, and access to the magnetic disk unit is performed again. The host unit, therefore, must wait until the sector data Z2 and Z3 are read from the magnetic disk unit in accordance with the access.

As described above, in the conventional method, when the related data are sequentially written in the order of sector addresses, the hit rate of the read ahead cache is increased so that data can be efficiently supplied. However, for example, when a series of related data are written on a plurality of sectors having non-sequential addresses, read access from the host unit becomes access at non-sequential addresses to greatly decrease the hit rate of the read ahead cache.

SUMMARY OF THE INVENTION

It is an object of the present invention to increase the hit rate of a read ahead cache by storing, in the read ahead cache, data related to data read-requested by a host unit. Especially, even when the data related to the read-requested data are written on a plurality of non-sequential sectors, the hit rate of the read ahead cache is increased to efficiently supply the data to the host unit.

In order to achieve the above object, according to the first aspect of the present invention, there is provided a disk control system connected to a host system, comprising memory means used as a secondary memory of the host system, a read ahead cache for storing a copy of part of sector data stored in the memory means, the read ahead cache being accessible at a higher speed than the memory means, writing means for, in accordance with at least one write request from the host system with a sector address changing in a predetermined direction, writing data with the same identification code on each sector designated by the write request in the memory means, means for, in accordance with a read request from the host system, supplying data to the host system when the read target data is stored in the read ahead cache, and storage means for, in accordance with the read request from the host system, reading out the read target data from the memory means to supply the data to the host system when the read target data is not stored in the read ahead cache and reading out data having an identification code equal to a first identification code added to the read target data from the memory means to store the readout data in the read ahead cache.

According to the second aspect of the present invention, there is provided a disk control system connected to a host system, comprising memory means used as a secondary memory of the host system, a read ahead cache for holding a copy of part of sector data stored in the memory means, the read ahead cache being accessible at a higher speed than the memory means, writing means for, in accordance with at least one write request from the host system with a sector address changing in a predetermined direction, writing data with the same identification code on each sector designated by the write request in the memory means, means for, in accordance with a read request from the host system, supplying data to the host system when the read target data is stored in the read ahead cache, first storage means for, in accordance with the read request from the host system, reading out the read target data from the memory means to supply the data to the host system when the read target data is not stored in the read ahead cache and storing a predetermined number (first sector number) of sector data corresponding to a sector address in the predetermined direction from a sector address of the read target data, and second storage means for reading, of the sector data corresponding to the sector address in the predetermined direction from a sector address of latest sector data written by the first storage means, sector data having an identification code equal to an identification code added to the read target data from the memory means to store the readout sector data in the read ahead cache.

According to the third aspect of the present invention, there is provided a control method applied to a disk control system having a memory connected to a host system and used as a secondary memory of the host system and a read ahead cache for holding a copy of part of data stored in the memory, comprising the steps of a) generating the same identification code in accordance with at least one write request from the host system with a designated address changing in a predetermined direction to write the identification code at the designated sector address on the memory, and b) searching a sector corresponding to a sector address in the predetermined direction from the sector address read-requested by the host system to read ahead and register sector data having the same identification code as in the read-requested sector in the read ahead cache.

In the control method according to the third aspect, the step b) includes the steps of c) sequentially registering a predetermined number (first sector number) of sector data on a predetermined number of sectors subsequent to the read-requested sector address in the predetermined direction, and d) searching a sector subsequent to a sector address of a sector finally registered in the step c).

In the disk control system having the above arrangement, the same identification code is generated in response to a series of write requests from the host system in the direction of incrementing or decrementing the address, and the identification code is written on the sector together with the data. Even when a series of data, e.g., data related to one file are written on a plurality of sectors having non-sequential addresses, the same identification code is written on the sectors as far as the values of the sector addresses change in the direction of incrementing or decrementing the address. Therefore, data having the same identification code as in the sector read-requested by the host system can be registered in the read ahead cache. In read access from the host system, a series of related data, e.g., data of the same file are often continuously read out, thereby increasing the hit rate of the read ahead cache.

According to the second aspect of the present invention, when different identification codes are allocated to data of the same file by data processing in accordance with the request from the host system, a predetermined number of sector data subsequent to the sector address of the read-requested data in an ascending or descending order are unconditionally registered in the read ahead cache. The sector data subsequent to the latest unconditionally registered sector address in the ascending or descending order are searched, and the sector data having the same identification code are registered in the read ahead cache. Therefore, the sector data can be flexibly registered in the read ahead cache, thereby increasing the hit rate of the read ahead cache.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are views for explaining a reading operation by using a read ahead cache applied to a conventional disk control system (Prior Art);

FIGS. 3A and 3B are views showing an example of writing codes written on sectors by a controller provided to the disk control system of the first embodiment;

FIGS. 7A and 7B are flow charts for explaining the data reading process executed by the controller provided to the disk control system of the first embodiment;

FIG. 8 is a view showing an example of the writing codes written on the sectors by the controller provided to the disk control system of the first embodiment;

FIG. 10 is a block diagram showing the arrangement of a disk control system according to the third embodiment of the present invention.

DETAILED DESCRIPTION OF THE PREFERRED EMBODIMENTS

The first embodiment of the present invention will be described below with reference to the accompanying drawings.

Figure 2:
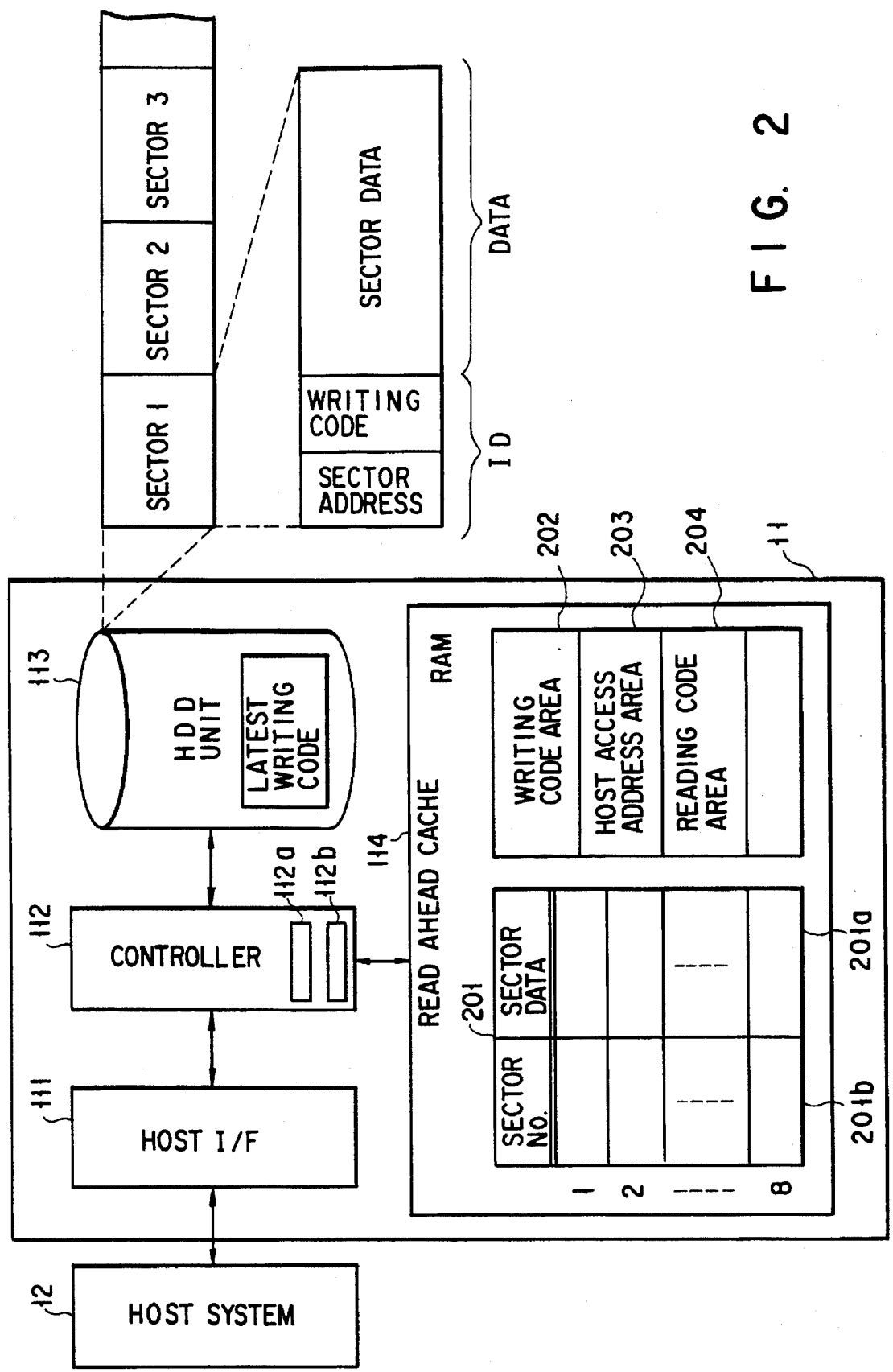
FIG. 2 is a block diagram showing the arrangement of a disk control system according to the first embodiment of the present invention.

FIG. 2 is a block diagram showing the arrangement of a magnetic disk control system according to the first embodiment of the present invention. A magnetic disk control system 11 is used as a secondary memory of a personal computer or workstation and comprises a host interface 111, a controller 112, an HDD (hard disk drive) unit 113, and a RAM (Random Access Memory) 114.

The host interface 111 interfaces commands and data between a host system 12 such as a personal computer or a workstation and the magnetic disk control system 11. More specifically, the host interface 111 is a disk interface such as IDE (Integrated Device Electronics) jointly developed by Compaq, U.S.A, and Corner Peripherals, U.S.A. The command and data received from the host system 12 are sent to the controller 112.

The controller 112 controls access to the hard disk drive unit 113 in accordance with the command from the host system 12. In this case, a data writing/reading operation with respect to the hard disk drive unit 113 is performed in units of sectors. A start sector subjected to writing/reading is designated by a write/read address included in the command from the host system 12.

The controller 112 has a data read ahead function for a read ahead cache 201 provided in the RAM 114. When the sector data designated by a read address from the host system 12 is present in the read ahead cache 201, the controller 112 reads out the target data from the read ahead cache 201 and transfers the data to the host system 12 without access to the hard disk drive unit 113. A read counter 112a is provided in the controller 112. This read counter 112a is used when the controller 112 executes the data read ahead function and detects that the number of read data reaches a predetermined number.

In the hard disk drive unit 113, sector data to be read ahead in the read ahead cache 201 is determined by a writing code (identification code) value written on each sector on the hard disk drive unit 113. This writing code is generated by the controller 112 whenever a write request is issued. Writing codes having the same value are generated when a series of write requests are issued for sectors in the order of ascending addresses. The selecting process of the read ahead data by using such a writing code will be described later in detail.

The read ahead cache 201 holds the data read ahead from the hard disk drive unit 113 by the controller 112. The read ahead cache 201 is constituted by a data table 201a for holding data on eight sectors and an address table 201b for holding sector addresses of the data held in this data storage area.

A data area for holding various data used in the data read ahead process by the controller 112 is provided in the RAM 114 in addition to the read ahead cache 201. In this embodiment, for example, a writing code area 202, a host access address area 203, and a reading code area 204 are provided.

The writing code area 202 holds the writing code value generated by the controller 112. The host access address area 203 holds the last sector address write-designated by the host system 12. The reading code area 204 holds the writing code value written on a sector read-designated by the host system 12.

Each sector on the hard disk drive unit 113 is constituted by an ID area where ID information such as a sector address is written and a data area where the data is written, as shown in FIG. 2. The writing code is written in a free portion of the ID area.

A specific sector on the hard disk drive unit 113 is used as an area for saving the last value (latest value) of the generated writing code.

The principle of the data read ahead process using the writing codes will be described below with reference to FIGS. 3A, 3B, and 4.

When the physical address of a sector designated by an address included in a write command from the host system 12 has a value equal to or larger than that of the sector address designated by a preceding write command, the controller 112 generates a writing code having the same value as in the writing code used in the preceding write command and writes the writing code on the designated sector together with the data. To the contrary, when the sector address to be written has a value smaller than that of the physical address of the precedently written sector, the controller 112 increments the writing code value used in the preceding write command by one and writes the writing code in the designated sector together with the data. In this embodiment, when a new writing code is generated, the latest writing code value is incremented by one. However, for example, the writing code may be determined by using a random number. Any method of preventing reissue of the already stored writing code can be adequately used.

The arrangement of writing codes generated in accordance with this operation process will be described with reference to FIGS. 3A and 3B.

Since all sectors on the hard disk drive unit 113 are unused, sequential write commands from the host system 12 designate writing positions in an order of sector addresses. For example, when the host system 12 writes data in an order of files A, B, C, and D, sector data A0 and A1 of the file A are stored at sector addresses (sector number) 1 and 2. Similarly, sector data B0 to B3 of the file B are stored at sector addresses 3 to 6, sector data C0 to C3 of the file C are stored at sector address 7 to 10, sector data D0 of the file D is stored at sector address 11, and sector data E0 to E2 of a file E are stored at sector addresses 12 to 14.

When the values of the sector addresses designated by write requests from the host system 12 sequentially increase, a writing code having the same value ("01") is generated in response to the write request and written on the corresponding sector.

When the data are rewritten in this state, the host system 12 overwrites the data on the sectors storing unnecessary data. For example, in a state shown in FIG. 3A, when the files A, D, and E are unnecessary and a file Z (sector data Z0 to Z3) is written, the sector data Z0 to Z3 are written on the sectors storing the unnecessary data in the order of addresses, as shown in FIG. 3B. Therefore, the sector data Z0 and Z1 are written at sector addresses 1 and 2, and the sector address Z2 and Z3 are written at sector addresses 11 and 12.

In this case, sector address 1 subjected to writing of the sector data Z0 has a value smaller than that of sector address 14 designated by the preceding write command. For this reason, when the sector data Z0 is written, the writing code value of "01" used in the preceding writing is incremented by one to generate a writing code value of "02". This writing code value of "02" is written at sector address 1 together with the sector data Z0.

The sector addresses subjected to writing of the subsequent sector data Z1 to Z3 have values larger than that of sector address 1 subjected to writing of the sector data Z0. Therefore, the writing code value of "02" used in writing of the sector data Z0 continues to be used.

As a result, the same writing code value of "02" is set on the sectors subjected to writing of a series of sector data Z0 to Z3.

In this state, when the host system 12 requests data reading from sector addresses 1 and 2, the controller 112 reads out the data Z0 and z1 at sector addresses 1 and 2 from the hard disk drive unit 113 and transfers the data to the host system 12. At the same time, the controller 112 searches the sector subsequent to sector address 2, extracts the sector data having the same writing code as in sector address 2, and registers the sector data in the read ahead cache 201.

Figure 4:
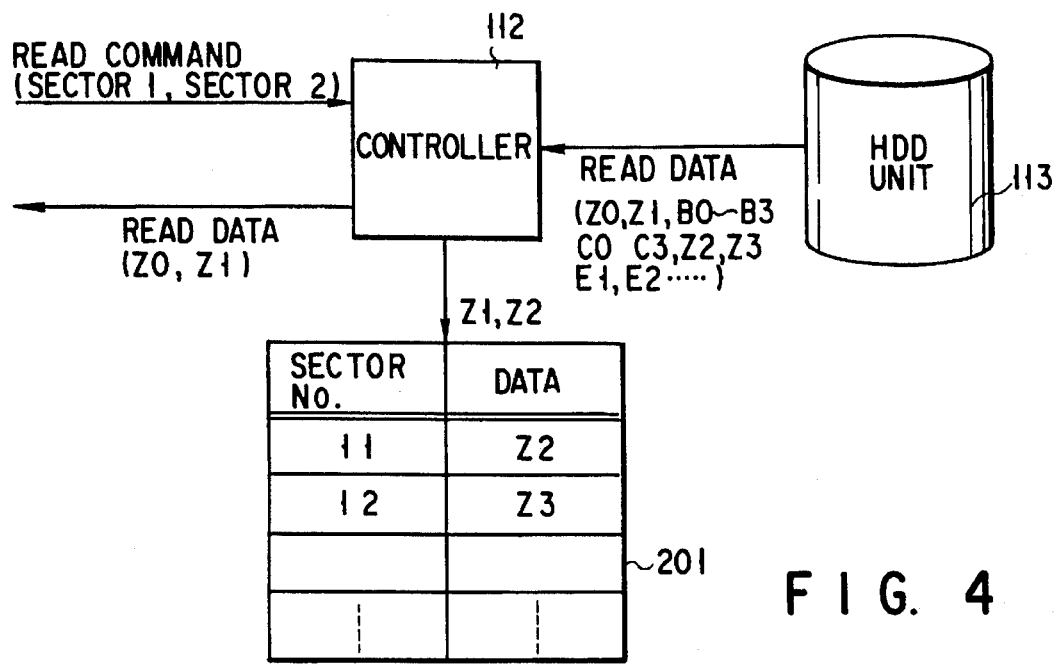
FIG. 4 is a view for explaining the principle of a read ahead process using the writing code, which is executed by the controller provided to the disk control system of the first embodiment.

Since the same writing code "02" as in sector address 2 is written at sector addresses 11 and 12, the data Z2 at sector address 11 and the data Z3 at sector address 12 are registered in the read ahead cache 201, as shown in FIG. 4.

Figure 6:
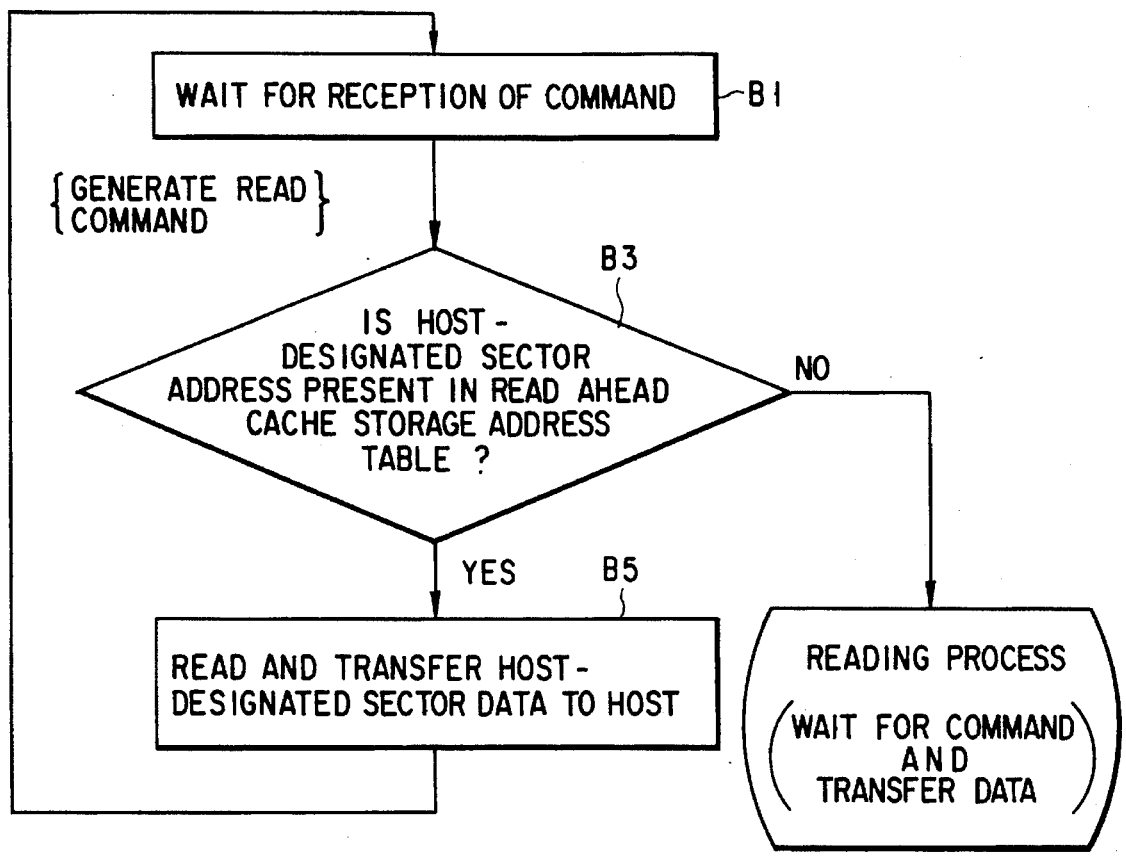
FIG. 6 is a flow chart for explaining a process operation for a host system in a data reading process executed by the controller provided to the disk control system of the first embodiment.
Figure 5:
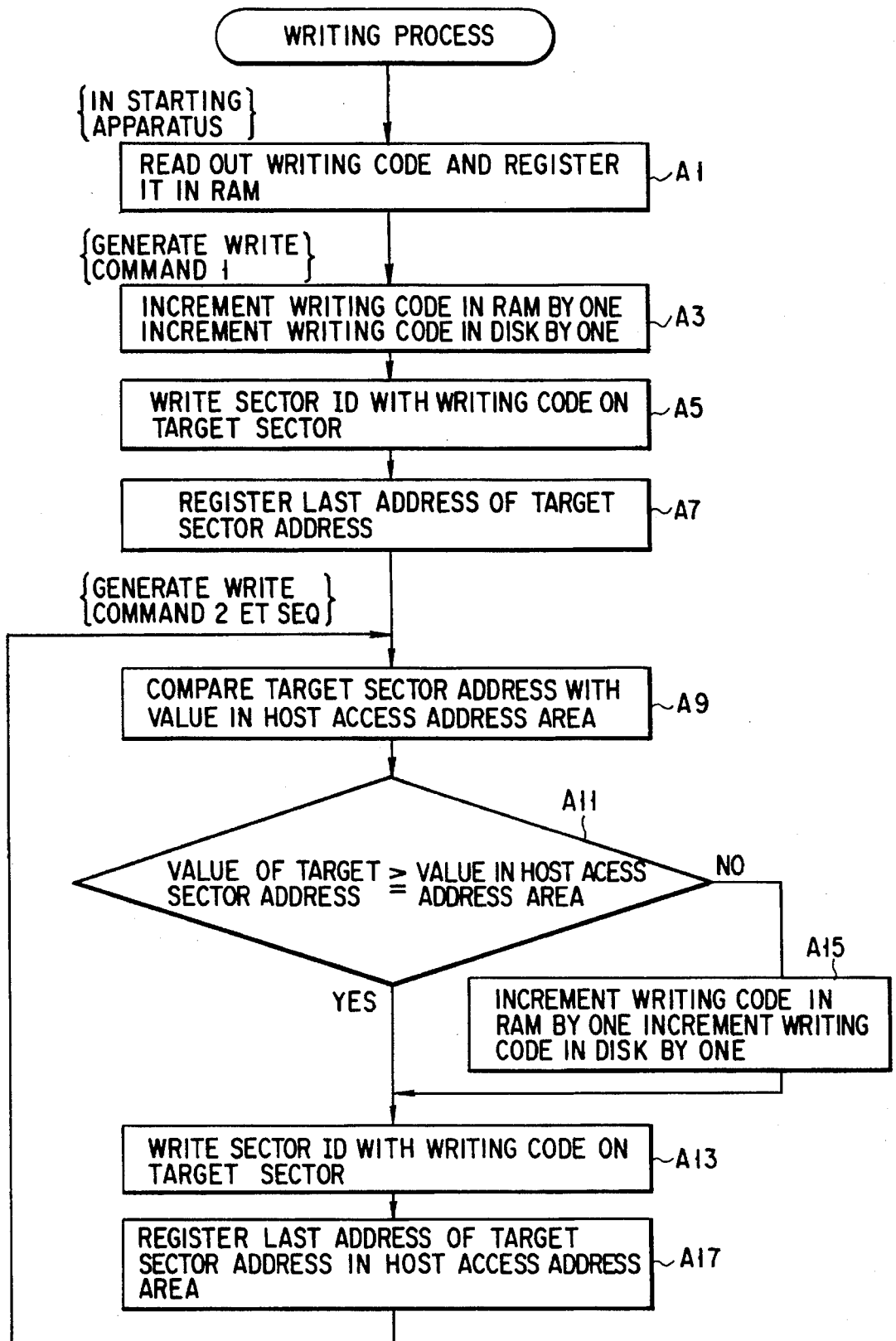
FIG. 5 is a flow chart for explaining a data writing process executed by the controller provided to the disk control system of the first embodiment.

The data writing/reading operation by the controller 112 will be described below with reference to FIGS. 5 to 7.

The writing process will be described with reference to the flow chart in FIG. 5.

For example, when the disk control system 11 is powered on and started, the controller 112 reads out the latest (recently used) writing code from the hard disk drive unit 113 and writes it in the writing code area 202 of the RAM 114 (step A1).

When the host system 12 sends the first write command after starting, the controller 112 increments the writing code value in the writing code area 202 of the RAM 114 by one and accordingly increments the latest writing code value in the hard disk drive unit 113 by one (step A3). The controller 112 then writes the sector ID with the writing code incremented by one on the target sector (step A5).

The controller 112 registers the address value of the target sector address (e.g., sector address 2 when the sector data A0 and A1 are written starting with sector address 1) in the host access address area 203 (step A7).

From the second write command after starting, the sector number subjected to access can return, and the process in steps A9 to A17 is performed.

When the second write command is sent, the controller 112 compares the value of the target sector address with that in the host access address area 203 (step A9) and checks if the value of the target sector address is larger than that in the host access address area 203 (step A11).

If the value of the target sector address is larger than that stored in the host access address area 203 (YES in step A11), the controller 112 continues to use the writing code value in the writing code area 202 of the RAM 114 and writes the sector ID information with the writing code on the target sector (step A13).

On the other hand, if the value of the target sector address is smaller than that in the host access address area 203 (NO in step A11), the controller 112 increments the writing code value in the writing code area 202 of the RAM 114 by one and accordingly increments the latest writing code value in the hard disk drive unit 113 by one (step A15). The controller 112 then writes the sector ID with the writing code incremented by one on the target sector (step A13).

The controller 112 registers the last address of the target sector address in the host access address area 203 (step A17).

In the above writing process by the controller 112, the ID information with the writing code is written on each sector in response to a series of write requests. As described above, the controller 112 executes the process in steps A9 to A17 in accordance with each write command subsequent to the second write command sent from the host system after the magnetic disk control system 11 is started. In this case, the write requests for sequential sectors can be processed by one write command. More specifically, when the write command for a plurality of sequential sectors is issued, the controller 112 writes the sector ID with the same writing code on a plurality of sequential sectors in step A13.

The operation related to the reading process by the controller 112 for the host system 12 will be described below with reference to FIG. 6.

The controller 112 always waits for a command from the host system 12 (step B1). When a read command from the host system 12 is received, the controller 112 checks if the sector address designated by the host is present in the address table 201b of the read ahead cache 201 (step B3). If the sector address designated by the host is present in the address table 201b (YES in step B3), the controller 112 reads out the data at the sector address designated by the host from the read ahead cache 201 and transfers the data to the host system 12 (step B5).

Figure 7B:
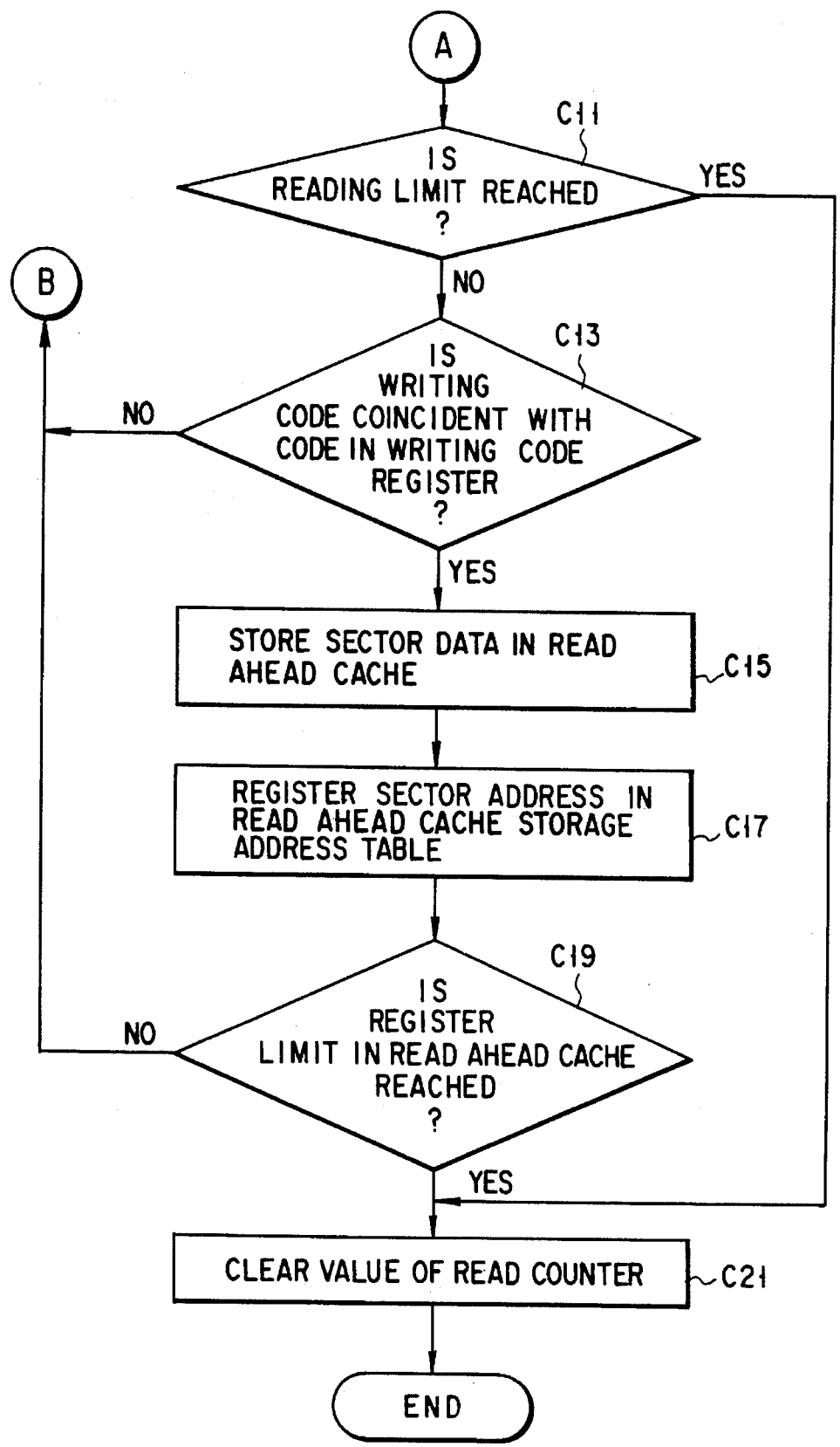

On the other hand, if the sector address designated by the host is not present in the address table 201b of the read ahead cache 201 (NO in step B3), the reading process shown in FIGS. 7A and 7B is executed. However, the controller 112 receives the command from the host system 12 during this reading process when the command is received, the controller 112 preferentially executes an interrupt process in accordance with the command. The controller 112 executes the reading process (to be described later) to continuously transfer the data read out from the hard disk drive unit 113 and prepared for transfer to the host system 12.

The reading operation by the controller 112 will be described below with reference to the flow charts shown in FIGS. 7A and 7B.

The controller 112 reads out the ID information and the data at the sector address from the hard disk drive unit 113 on the basis of the sector address included in the read command sent from the host system 12 (step C1). The controller 112 registers the writing code on the read sector in the reading code area 204 (step C3) and prepares to transfer the data at the sector address designated by the host to the host system 12 (step C5).

The controller 112 then reads out the ID information at the sector address subsequent to the read sector address from the hard disk drive unit 113 (step C7). The controller 112 increments the count value of the read counter 112a by one (step C9) and checks if this value reaches a predetermined reading limit (step C11). As described in step C7, in this embodiment, the controller 112 physically searches the sector address in a backward direction (in a direction of inner circumference), i.e., in a direction that the sector address (sector number) is incremented.

If the count value does not reach the reading limit (NO in step C11), the controller 112 checks if the writing code value included in the read ID information accords with the value stored in the reading code area 204 (step C13).

If the writing code value included in the ID information accords with the value stored in the reading code area 204 (YES in step C13), the controller 112 registers the data on the sector read in step C7 in the data table 201a of the read ahead cache 201 and accordingly registers the sector address in the address table 201b of the read ahead cache 201 (steps C15 and C17).

The controller 112 then checks if the number of sectors reaches the register limit in the read ahead cache 201 (step C19). For example, in the first embodiment, eight sectors can be registered at maximum. If the eighth sector is registered in steps C15 and C17, it is determined that the number of sectors reaches the limit.

If the number of sectors reaches the register limit in the read ahead cache 201 (YES in step C19) or the reading limit (YES in step C11), the value of the read counter is reset (step C21), and the reading process is ended.

If the writing code value included in the ID information does not accord with the value stored in the reading code area 204 (NO in step C13), or it is determined that the number of sectors does not reach the register limit in the read ahead cache 201 (NO in step C19), the flow returns to step C7 to read out the ID information at the subsequent sector address.

When the physical number of read sectors exceeds the limit, the number of sectors reaches the register limit in the read ahead cache 201, or a command is sent from the host system 12, the controller interrupts/ends data registration in the read ahead cache 201.

As described above, in the first embodiment, the writing codes having the same value are generated in response to the write requests from the host system 12 in the direction of incrementing the address. The ID information with the writing code is written on the sectors. For this reason, even when a series of related data are written on a plurality of sectors having non-sequential addresses, the same writing code is written on each sector as far as the values of the sector addresses change in the direction of incrementing the address. Only the data on the sectors having the same writing code as in the sector read-requested by the host system 12 is read ahead and registered in the read ahead cache 201. Therefore, a series of related data can be registered in the read ahead cache 201.

In many read requests from the host system 12, a series of related data, e.g., data of the same file, are continuously read out. Therefore, as described above, the sector data having the same writing code are selectively read ahead, thereby increasing the hit rate of the read ahead cache 201.

A disk control system according to the second embodiment of the present invention will be described below.

According to the disk control system of the first embodiment, even when a series of related data are written on a plurality of sectors having non-sequential addresses, the hit rate of the read ahead cache can be increased. However, even in this method, the following problems may be posed.

For example, assume that in the state of the data and the writing codes as shown in FIG. 3B, only the content of the data C2 of the file C is rewritten by the host system 12. In this case, a value of "03" is written as a writing code of the sector data C2 stored at sector address 9. This state is shown in FIG. 8.

Assume that, in this state, the host system issues an access request for the sector data C0, and accordingly, a process of data registration in the read ahead cache is performed. According to the above first embodiment, since the writing code of the sector data C2 is different from that of the sector data C0, the sector data C2 is not registered in the read ahead cache. Actually, after the host system issues the access request for the sector data C0, an access request for the sector data C2 of the same file C is likely issued. Therefore, if the host system issues the access request for the sector data C2, the hard disk drive unit must be accessed because the sector data C2 is not registered in the read ahead cache, and a process of data registration in the read ahead cache is performed again.

Similarly, if an access request for the sector data C3 is issued after the access request for the sector data C2, the sector data C3 is not registered in the read ahead cache.

In the second embodiment, a conventional unconditional storage method regardless of writing code is used together with a storage method in accordance with a writing code of the above first embodiment.

The arrangement of the disk control system of the second embodiment is almost the same as in the first embodiment shown in FIG. 2, and a detailed description thereof will be omitted. In a controller 112, however, an unconditional storage counter 112b is provided in addition to a read counter 112a. This unconditional storage counter 112b is used to count sector data to be unconditionally stored in a read ahead cache 201 and detects that the number of sector data to be unconditionally stored exceeds a predetermined number. In the second embodiment, the number of sector data to be unconditionally stored is set to be four, i.e., half the number of sector data to be registered in the read ahead cache 201.

Figure 9A:
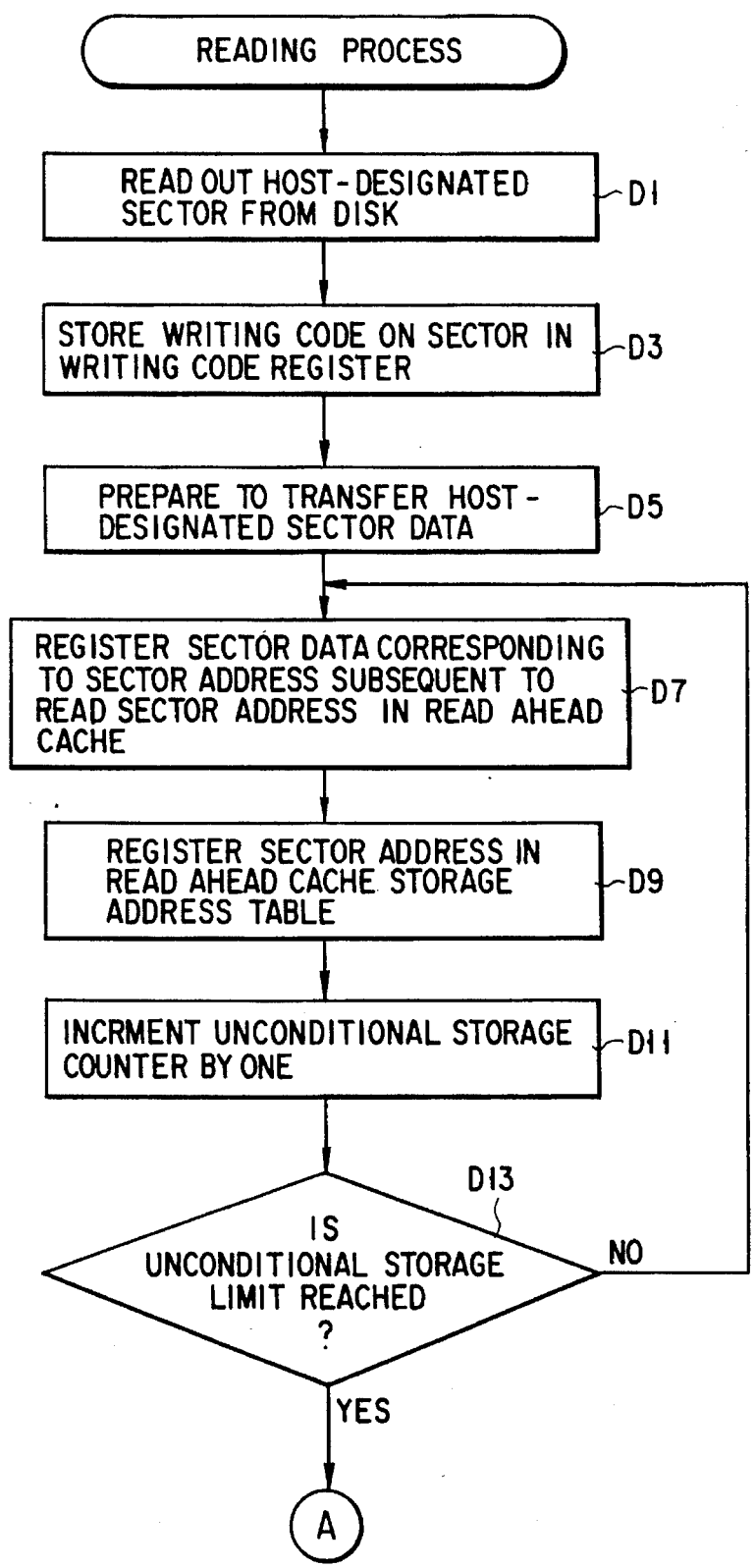
FIGS. 9A and 9B are flow charts for explaining a data reading process in a disk control system according to the second embodiment of the present invention.
Figure 9B:
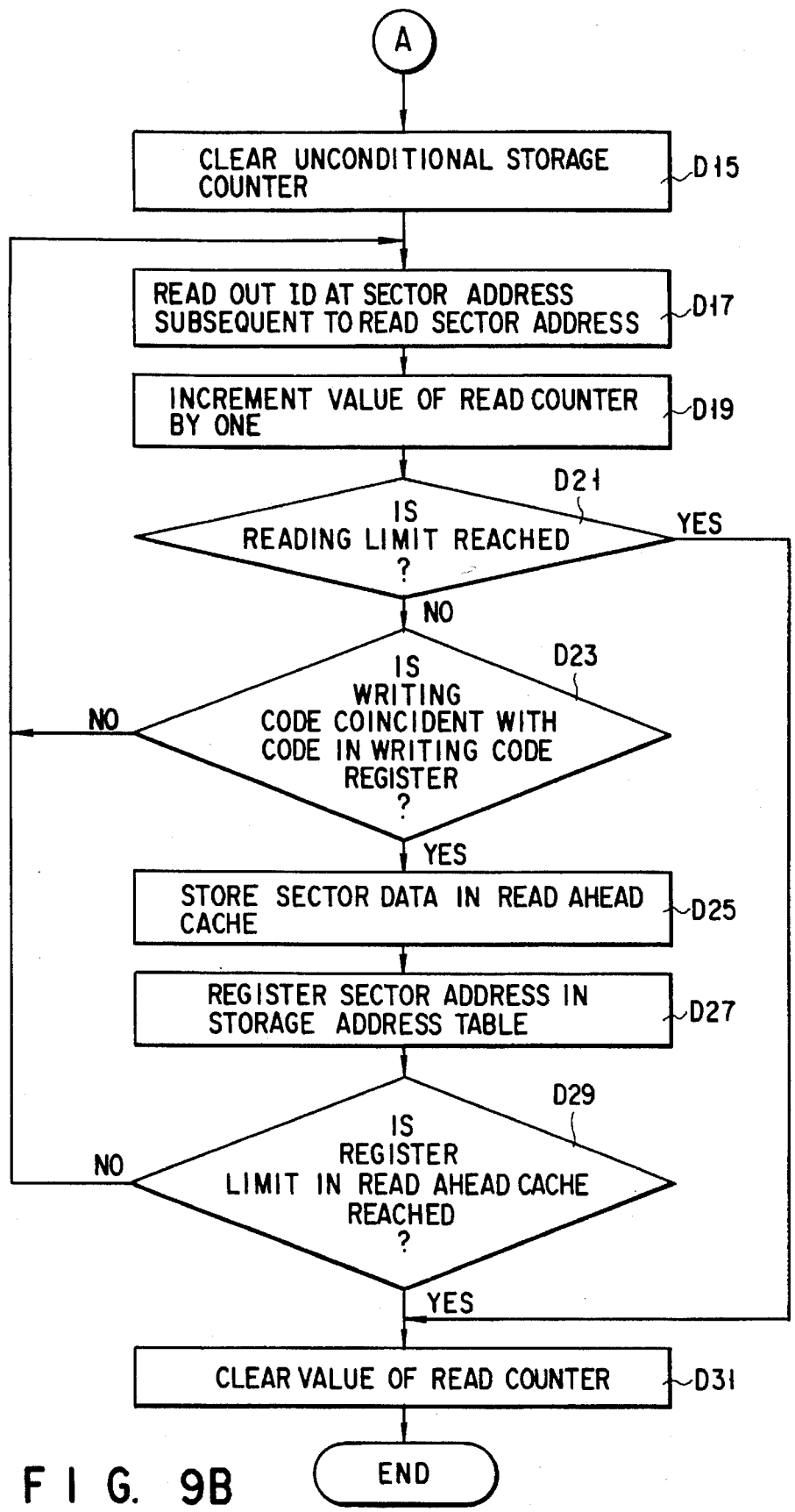

The operation related to the reading process of the second embodiment will be described below with reference to FIGS. 9A and 9B. The writing process by the controller 112 and the process for the host are the same as in the first embodiment, and a detailed description thereof will be omitted.

The controller 112 reads out ID information and data at a sector address from a hard disk drive unit 113 on the basis of the sector address included in a read command from the host system 12 (step D1). The controller 112 registers the writing code on the read sector in a reading code area 204 (step D3) and prepares to transfer the data at the sector address designated by the host to the host system 12 (step D5).

The controller 112 then registers the sector data corresponding to the sector address subsequent to the sector address read from the hard disk drive unit 113 in a data table 201a of the read ahead cache 201 (step D7). The controller 112 registers the corresponding sector address in an address table 201b (step D9). The controller 112 then increments the value of the unconditional storage counter by one and checks if this count value reaches a predetermined unconditional storage limit (steps D11 and D13). As described above, since the number of sectors to be unconditionally stored is set to be four, the controller 112 checks, in step D13, if the count value is four.

If the count value of the unconditional storage counter does not reach the limit (NO in step D13), the flow returns to step D7 to perform the unconditional storage operation of the subsequent sector data.

If the count value of the unconditional storage counter reaches the limit (YES in step D13), the controller 112 resets the count value of the unconditional storage counter (step D15). The controller 112 then reads out the ID information at the sector address subsequent to the latest read sector address from the hard disk drive unit 113 (step D17). The controller 112 increments the count value of the read counter 112a by one (step D19) and checks if this count value reaches a predetermined reading limit (step D21).

If the count value does not reach the reading limit (NO in step D21), the controller 112 checks if the writing code value included in the read ID information accords with the value stored in the reading code area 204 (step D23).

If the writing code value included in the ID information accords with the value stored in the reading code are 204 (YES in step D23), the controller 112 registers the sector data read out in step D17 in the data table 201a of the read ahead cache 201 and accordingly registers the sector address in the address table 201a of the read ahead cache 201 (steps D25 and D27).

The controller 112 then checks if the number of sectors reaches the register limit in the read ahead cache 201 (step D29). For example, in the first embodiment, the number of sectors to be registered is set to be eight. When the eighth sector is registered in steps D25 and D27, it is determined that the number of sectors reaches the limit.

When the number of sectors reaches the register limit in the read ahead cache 201 (YES in step D29) or the reading limit (YES in step D21), the value of the read counter 201a is reset (step D31), and the reading process is ended.

If the writing code value included in the ID information does not accord with the value stored in the reading code area 204 (NO in step D23), or it is determined that the number of sectors does not reach the register limit in the read ahead cache 201 (NO in step D29), the flow returns to step D17 to read out the ID information at the subsequent sector address.

When the physical number of read sectors exceeds the limit, the number of sectors reaches the register limit in the read ahead cache 201, or a command is sent from the host system 12, the controller interrupts/ends data registration in the read ahead cache 201.

As described above, in the second embodiment, registration in the read ahead cache 201 in accordance with the writing codes, as shown in the first embodiment, is performed as well as the conventional unconditional storage operation. In this case, a cache miss hit which may occur when the sector data of the same file have different writing codes can be prevented. The number of sectors to be unconditionally stored and the number of sectors to be stored in accordance with the writing codes can be freely set within the range of the number of sectors to be registered in the read ahead cache.

Even when a different writing code is allocated to one of a series of related data of the same file by updating the data, the sector data at a predetermined address subsequent to the sector data transferred to the host system is registered in the read ahead cache 201. Therefore, the hit rate of the read ahead cache can be increased.

For example, in a state shown in FIG. 8, when an access request for the sector data C0 is issued, and accordingly, a process of data registration in the read ahead cache is performed, the sector data C2 is unconditionally stored in the read ahead cache by the processes in steps D7 and D9 although the writing code of "01" of the sector data C0 is different from the writing code of "03" of the sector data C2. Since these sector data are included in the same file C, the sector data which are likely to be continuously accessed are registered in the read ahead cache, thereby increasing the hit rate.

A disk control system according to the third embodiment of the present invention will be described below. In the above first and second embodiments, only the read ahead cache of the hard disk drive has been described. However, the present invention can be applied to any external memory which is read/write-accessed in units of sectors in accordance with an access request from the host system. Therefore, the present invention can also be applied to a high-speed disk unit such as a semiconductor disk unit or the like.

In this case, however, as a memory used as a read ahead cache 201, a memory element such as an SRAM (static random access memory) must be used, which is accessible at a higher speed than a memory element such as a flash EEPROM (electrically erasable and programmable read only memory) used to a semiconductor disk unit.

FIG. 10 is a block diagram showing the arrangement of the third embodiment. In this embodiment, as described above, a flash EEPROM 115 is used in place of a hard disk. Other constituent elements are the same as those in FIG. 2, and a detailed description thereof will be omitted. In this case, however, since the flash EEPROM 115 is used, the sector addresses stored in the ID information on the sectors are omitted. In addition, a table (not shown) for converting a sector address designated by a host system 12 into a physical address of the flash EEPROM 115 is provided.

As for the operation of the disk control system of the third embodiment, the sector data writing process and a process for the host system 12 by a controller 112 related to the sector data reading process are the same as those in the first embodiment. The sector data reading process by the controller 112 may be a process including sector data registration on the basis of writing codes described in the first embodiment, or a combination of the registration on the basis of the writing codes and an unconditional storage process described in the second embodiment. In these methods, as described above, the hit rate can be increased, thereby realizing highly efficient data supply to the host system.

According to the third embodiment, a flash EEPROM can be used as a recording medium in place of a hard disk. In this case, various problems caused by the mechanical movable portion in use of the hard disk drive can be prevented. For example, since the hard disk drive must indispensably include a mechanical movable portion and therefore tends to suffer external influences such as vibrations or the like, an erroneous operation may occur. This problem can be solved by using the flash EEPROM. In addition, when the flash EEPROM is used, a compact disk controls system can be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk control system connected to a host system, comprising:

memory means used as a secondary memory of said host system;

a read ahead cache for storing a copy of part of sector data stored in said memory means, said read ahead cache being accessible at a higher speed than said memory means;

a first register for storing an identification code;

a second register for storing a sector address;

writing means for, in accordance with a write request with a sector address from said host system, comparing the sector address of the write request with the sector address in said second register, controlling the identification code stored in said first register in accordance with a result of the comparison, and writing data along with the identification code stored in said first register into said memory means after the comparison;

means for, in accordance with a read request with a sector address from said host system, supplying data to said host system when the read request data is stored in said read ahead cache; and read ahead means for, in accordance with the read request from said host system, reading out the read request data from said memory means to supply the read request data to said host system when the read request data is not stored in said read ahead cache, and reading out additional data having an identification code equal to an identification code stored with the read request data from said memory means in a predetermined direction by changing a sector address from the sector address of the read request data, to store the additional read out data in said read ahead cache, an amount of additional data read out from said memory means corresponding to a predetermined number of sectors.

2. A system according to claim 1, wherein said memory means includes a hard disk.

3. A system according to claim 1, wherein said memory means includes a flash EEPROM (electrically erasable and programmable read only memory).

4. A system according to claim 2, wherein said read ahead means includes:

reading means for reading out an identification code stored with additional data corresponding to a sector address in the predetermined direction from the sector address of the read request data;

means for storing additional data corresponding to the read identification code in said read ahead cache when the read out identification code is equal to the identification code of the read request data; and means for disabling said reading means after said reading means is repeatedly executed a predetermined number of times.

5. A system according to claim 1, wherein the predetermined direction includes a direction of incrementing an address.

6. A disk control system connected to a host system comprising:

memory means used as a secondary memory of said host system;

a read ahead cache for holding a copy of part of sector data stored in said memory means, said read ahead cache being accessible at a higher speed than said memory means, the part of sector data corresponding to an amount of data equal to a sum of a first sector number and a second sector number;

a first register for storing an identification code;

a second register for storing a sector address;

writing means for, in accordance with a write request with a sector address from said host system, comparing the sector address of the write request with the sector address in said second register, controlling the identification code stored in said first register in accordance with a result of the comparison, and writing data along with the identification code stored in said first register into the memory means after the comparison;

means for, in accordance with a read request with a sector address from said host system, supplying data to said host system when the read request data is stored in said read ahead cache;

first read ahead means for, in accordance with the read request from said host system, reading out the read request data from said memory means to supply the data to said host system when the read request data is not stored in said read ahead cache, and reading out a predetermined number of additional data equal to the first sector number from said memory means in a predetermined direction from the sector address of the read request data to store the additional read out data in said read ahead cache; and second read ahead means for, in accordance with the read request from said host system, reading out additional data having an identification code equal to an identification code stored with the read request data from said memory means in the predetermined direction to store the additional read out data in said read ahead cache, an amount of additional read out data corresponding to the second sector number.

7. A system according to claim 6, wherein said memory means including a hard disk.

8. A system according to claim 6, wherein said memory means includes a flash EEPROM (electrically erasable and programmable read only memory).

9. A system according to claim 6, wherein the predetermined direction includes a direction of incrementing an address.

10. A system according to claim 6, wherein said second sector number is obtained by subtracting the first sector number from a maximum number of sector data to be stored in said read ahead cache.

11. A control method applied to a disk control system having a memory connected to a host system which is used as a secondary memory of said host system, a first register for storing an identification code, a second register for storing a sector address, and a read ahead cache for holding a copy of part of data stored in said memory, the method comprising the steps of:

comparing, in response to a write request with a sector address from said host system, the sector address of the write request with the sector address stored in said second register;

controlling the identification code stored in said first register in accordance with a result of the comparison by said comparing step;

writing data along with the identification code stored in said first register into said memory after the comparison by said comparing step;

searching, in response to a read request from said host system, the read ahead cache for data corresponding to said read request;

retrieving the read request data from said memory to supply the read request data to said host system when the read request data is not stored in said read ahead cache; and retrieving additional data having an identification code equal to an identification code stored with the read request data from said memory in a predetermined direction by changing a sector address from a sector address of the read request data to store the additional data in said read ahead cache.

12. A method according to claim 11, wherein said memory includes a hard disk drive.

13. A method according to claim 11, wherein said memory includes a flash EEPROM (electrically erasable and programmable read only memory).

14. A method according to claim 11, wherein the predetermined direction includes a direction of incrementing an address.

15. A method according to claim 11, wherein said retrieving step includes the steps of:

sequentially retrieving a predetermined number of additional data subsequent to the sector address of the read request data in the predetermined direction, and searching a sector subsequent to a sector address of a sector finally retrieved in said sequentially retrieving step.

16. A method according to claim 15, wherein said retrieving step further includes the step of retrieving additional data having a same identification code as the identification code of the read request data in an amount obtained by subtracting the predetermined number from a maximum number of sectors to be stored in said read ahead cache.

17. A method according to claim 16, wherein said searching step includes the step of searching a predetermined number of sectors.

18. A method according to claim 11, wherein said controlling step changes the identification code stored in said first register when the sector address stored in said second register is larger than the sector address of the write request.

* * * * *

UNITED STATES PATENT AND TRADEMARK OFFICE
CERTIFICATE OF CORRECTION

PATENT NO. : 5,557,767
DATED : September 17, 1996
INVENTOR(S) : Hiroshi SUKEGAWA It is certified that error appears in the above-indentified patent and that said Letters Patent is hereby corrected as shown below:

In claim 8, column 14, line 12, "memory." should read --memory).--

Signed and Sealed this

Twenty-eighth Day of January, 1997

Attest:

BRUCE LEHMAN

*Attesting Officer*  *Commissioner of Patents and Trademarks*